(12) United States Patent
Lau et al.

(10) Patent No.: US 7,238,404 B2
(45) Date of Patent: Jul. 3, 2007

(54) THIN SHEET MICA WEDGES WITH SEMI-CONDUCTING PROPERTIES

(75) Inventors: James Frederick Lau, Orlando, FL (US); Douglas James Conley, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 109 days.

(21) Appl. No.: 10/797,456

(22) Filed: Mar. 10, 2004

(65) Prior Publication Data

US 2005/0202235 A1 Sep. 15, 2005

(51) Int. Cl.
 B32B 5/08 (2006.01)
 B32B 9/04 (2006.01)
(52) U.S. Cl. .............. 428/103; 428/113; 428/143; 428/147; 428/323
(58) Field of Classification Search .......... 428/323, 428/103, 113, 143, 147
See application file for complete search history.

(56) References Cited

U.S. PATENT DOCUMENTS

| | | | | |
|---|---|---|---|---|
| 2,427,700 A | * | 9/1947 | Atkinson et al. | 174/106 SC |
| 3,845,438 A | * | 10/1974 | Mendelshohn et al. | 336/209 |
| 3,930,915 A | * | 1/1976 | Mendelsohn et al. | 156/53 |
| 4,013,987 A | * | 3/1977 | Foster | 336/206 |
| 4,091,139 A | * | 5/1978 | Quirk | 442/117 |
| 4,533,580 A | * | 8/1985 | Otty | 428/34.2 |
| 4,606,785 A | * | 8/1986 | Zeise | 156/305 |
| 4,714,653 A | * | 12/1987 | Cassat | 428/328 |
| 5,365,135 A | | 11/1994 | Konrad et al. | |
| RE35,349 E | * | 10/1996 | Taguchi et al. | 347/200 |
| 5,562,978 A | * | 10/1996 | Jacobson | 428/323 |
| 5,723,920 A | * | 3/1998 | Markovitz et al. | 310/42 |
| 6,103,382 A | * | 8/2000 | Smith et al. | 428/417 |
| 6,124,659 A | | 9/2000 | Rowe et al. | |
| 6,200,914 B1 | * | 3/2001 | Schulten | 442/111 |
| 6,218,756 B1 | | 4/2001 | Gardner et al. | |
| 6,238,790 B1 | | 5/2001 | Smith et al. | |
| 6,528,572 B1 | * | 3/2003 | Patel et al. | 524/495 |
| 6,924,027 B2 | * | 8/2005 | Matayabas et al. | 428/323 |

* cited by examiner

Primary Examiner—H. Thi Le

(57) ABSTRACT

The present invention provides for thin sheet wedges that comprise a mica matrix impregnated with a conductive resin. The mica matrix is composed of mica flakes. The thin sheet wedge has a semi-conductive property of 500–500,000 ohms per square. In one embodiment the thin sheet wedge further comprises at least one glass fiber layer. In a particular embodiment the glass fiber layer is a backing for the mica matrix. In another particular embodiment the glass fiber is interwoven with the mica matrix. The glass fiber layer may itself be impregnated with a conductive resin.

20 Claims, 2 Drawing Sheets

THIN SHEET MICA WEDGES WITH SEMI-CONDUCTING PROPERTIES

BACKGROUND OF THE INVENTION

The armature of a power generator is made up of a magnetic iron core, referred to as a stator core, that guides the magnetic flux, and conductive windings that carry the current. The magnetic core is cylindrically shaped and made up of thousands of thin laminations of steel clamped together to make a solid structure. The core has axial slots for the conductive windings, and these windings form loops around arcs of the stator core. A loop is formed by a coil that includes the conducting wires insulated from the core so that the wires can maintain a voltage difference from coil to coil and from coil to core. The coils fit into the slots in the core. FIG. 1 illustrates one example of how a portion of the end of a stator core 20 may appear. This figure focuses on a cross section of one slot 28. As shown, the stator comprises many neighboring coils 26 aligned in unison around the shaft, though gaps 30 between the coils and the surrounding abutments are usually tough to avoid.

The insulated coil width must be slightly smaller than the width of the slot to allow the coil to be installed in the slot. Once the coil is installed, it must be tightened in the slot; therefore, side wedges are driven between the slot wall and the coil. Additionally springs and wedges are driven at the top of the slot to keep the coils radially tight in the slot. It is important that the coils are tight in the slot because movement can cause wear of the insulation. Electromagnetic forces that peak twice per cycle exist that would vibrate a loose coil radially. Weaker forces also exist that would vibrate a loose coil circumferentially.

Traditionally side wedges have been composed of the thin sheets of mica or semi-conducting glass epoxy wedges. Each with their own advantages. Mica has advantages in that it is strong yet flexible, and is resistant to the generator environment. Further, due to the flaky nature of mica sheets, if a thin sheet mica wedge begins to lose cohesion through delamination, it will actually expand, further tightening itself within the slot.

Despite the benefits of using thin sheet mica wedges, it has been found that the semi-conducting wedges improve generator performance by dissipating any surface charge from the wound coils. Since mica is such a good insulator, other materials were needed to make semi-conductive thin sheet wedges. One technique is to impregnate a laminated glass fabric with a conductive resin. However, the laminated glass is not as stiff as the mica, and does not make as strong a supportive wedge. Further, under the strong electrical and magnetic conditions of the generator, the resin impregnated glass breaks down; and unlike the mica that actually expands when delaminating, the organic matrix simply disintegrates leaving a loose fragile glass weave.

Efforts have been made to combine the semi-conductive nature of the resin impregnated glass with the strong support of the mica by inserting alternating wedges of the glass and mica. Unfortunately that produces a wedge matrix that is neither fully supportive nor properly semi-conductive.

What is needed is a thin sheet wedge that has the strength and durability of a mica sheet, while also exhibiting the semi-conductive properties of a resin impregnated glass sheet.

SUMMARY OF THE INVENTION

The present invention provides for thin sheet wedges that comprise a mica matrix impregnated with a conductive resin. The mica matrix is composed of mica flakes. The thin sheet wedge has a semi conductive property of 500–500,000 ohms per square and a tensile modulus of 1–8 million pounds per square inch (PSI).

In one embodiment the thin sheet wedge further comprises at least one glass fiber layer. In a particular embodiment the glass fiber layer is a backing for the mica matrix. In another particular embodiment the glass fiber is interwoven with the mica matrix. The glass fiber layer may itself be impregnated with a conductive resin.

In one embodiment mica flakes comprise at least one of muscovite, phlogopite and combinations thereof.

In a particular embodiment the ratio of the mica in the mica matrix to the glass is approximately between 2:1 and 7:1 by weight.

In another embodiment the percentage of conductive resin in the thin sheet wedge is approximately 15–40% by weight.

In another embodiment the thickness of the thin sheet wedge is between about 15–80 mils (0.38–2.0 mm).

DETAILED DESCRIPTION OF THE INVENTION

The present invention provides for thin sheet wedges that comprise a mica matrix impregnated with a conductive resin. Mica, as used in the present invention, is in the form of mica flakes, which are usually muscovite, $KAl_2AlSi_3O_{10}(OH)_2$, or phlogopite, $KMg_3AlSi_3O_{10}(OH)_2$, or mixtures of the two. Mica is unique amongst materials in having a high resistance to partial discharges thereby increasing the voltage endurance and prolonging the life of insulation materials such as thin sheet wedges. High energy electrons resulting from partial discharges (sometimes referred to as electron avalanches) are slowed down and de-energized by the strong positive fields generated by the arrays of $K^+$ ions held within the silicate lattice of the mica.

Since mica acts as such a good insulator, it has not been known in the art to use mica in a semi-conducting manner. As discussed above, when semi-conducting properties were needed in a thin sheet wedge, the mica was replaced by a laminated glass fabric. However, the laminated glass proved too fragile to be a proper substitute to the mica. The present invention solves this problem by impregnating a semiconductive resin in the mica matrix of the thin sheet wedge. The mica-matrix will still be resistant to discharge damage, but the semiconductive matrix will also allow proper dissipating of charges from the coil surface.

Though the semi-conducting properties of the thin sheet wedge may vary depending on factors such as the type of resin used, in a particular embodiment the semi-conductive properties are about 500–500,000 ohms per square. In a more particular example, properties are from 100,000–300,000 ohms per square. During usage in high electrical fields, some of the outer resin on the wedge may degrade, and some of the mica flake may loosen.

Figure 1:
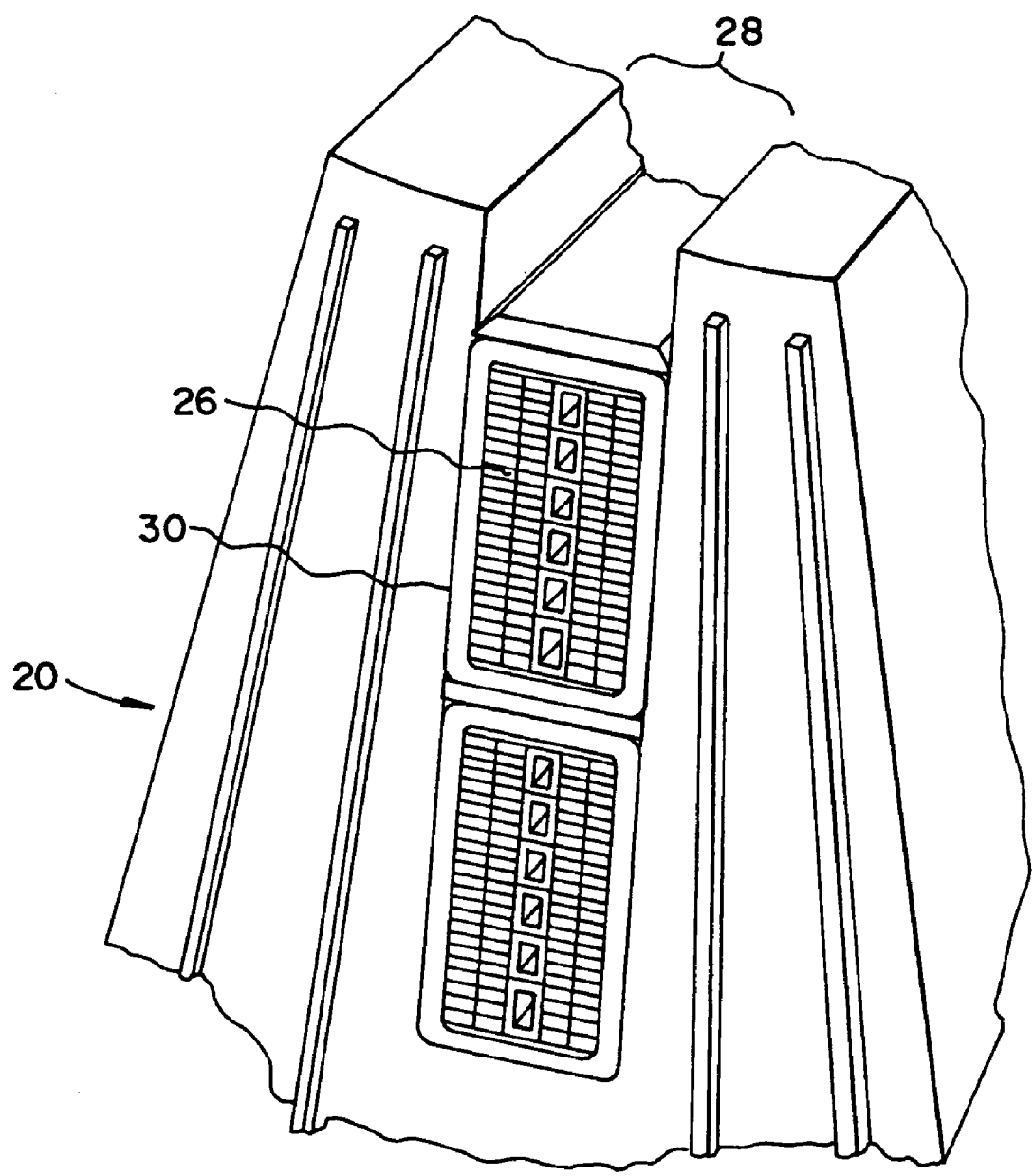
FIG. 1 illustrates an example of a typical generator with coils fit into particular slots.
Figure 2:
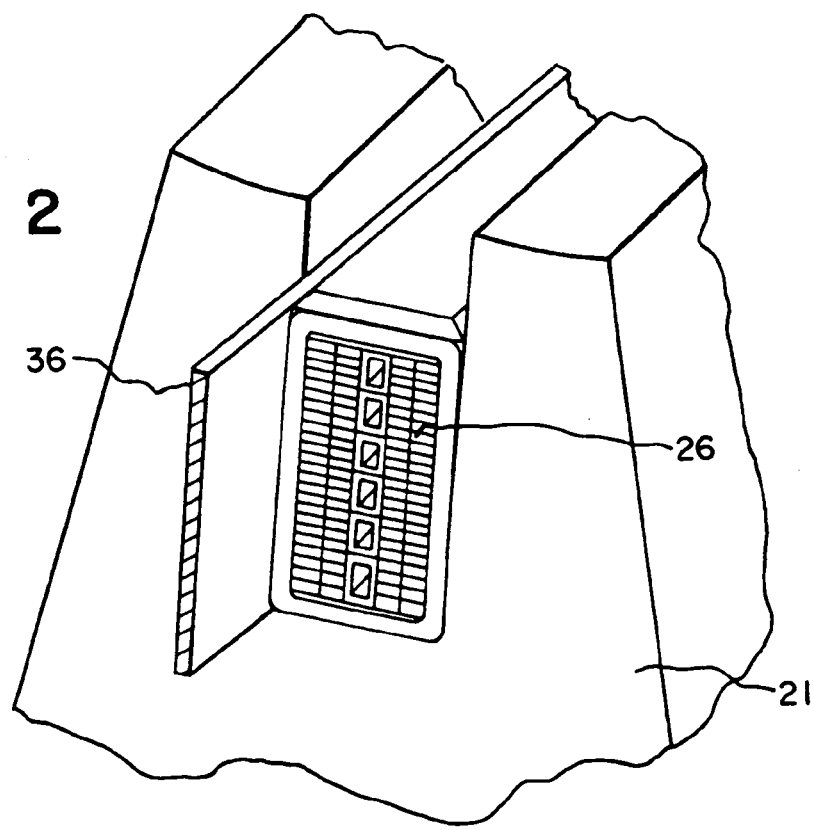
FIG. 2 illustrates a thin sheet wedge of the present invention being used to secure a coil into a slot.

FIG. 2 illustrates an embodiment of the present invention being used to secure a coil into place. In this figure, a close-up 21 of a portion of the stator is shown. In this example a coil 26 is in place in a slot. Common problems in generator stators is that the slot is slightly larger than the coil in order to accommodate variances in coil structure. As a result a thin sheet wedge 36 is used to secure the coil within the slot. Since wedges are often inserted manually, it may be useful to have the wedge significantly larger than the space that it is to fill, with the protruding portion being trimmed later. The wedges may also be tailored to fit a variety of spaces, having curved or stepped ends. Many of the wedges are exceedingly narrow, as little as 15 mils (0.38 mm). As they get thicker it may be desirable to taper the lead edge so that they may be forced into position better. Though the possible range of thickness for the thin sheet wedges may vary quite a bit depending on need, for most generator applications the thickness of the wedge will be about 15–80 mils (0.38–2.0 mm).

Impregnation of a resin may be done by a variety of techniques known in the art, including vacuum-pressure impregnation ("VPI"). The VPE process consists of evacuating a chamber containing the coil in order to remove air and moisture trapped in the mica tape, then introducing the resin under pressure to impregnate the mica tape completely with resin thus eliminating voids, producing near continuous resin in a mica matrix. This resin is subsequently cured by a prolonged heating cycle.

Another method of impregnating the resin is to layer a semi-cured resin onto the mica matrix. Semi-cured resins are substantially drier than non-cured resins and may be handled and distributed more easily. A method of impregnating a matrix with a semi-cured resin involves coating the matrix and then pressing and heating the composite. Preferably the semi-cured resin is mounted between layers of matrix.

Figure 3:
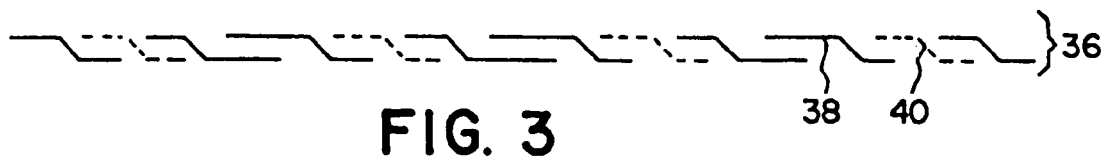
FIG. 3 illustrates a simplified example of one type of weave used when a glass fabric is interwoven with the mica matrix.

The mica flakes are more easily handled when mounted on a glass fabric backing. If the mica flakes are mounted on a glass fabric prior to impregnation of the resin then the glass fabric will be similarly impregnated. However other techniques of impregnating the resin, such as using a semi-cured resin discussed above, may allow for a specific distribution of the conducting resin. Other combinations of glass fabric and a mica matrix may also be used. For example, the mica and glass fabric may be interwoven as shown in FIG. 3. Note that spaces between the layers are shown for clarity and will not actually be present in a thin sheet wedge. In this example, a half-lap interweave is illustrated where the predominant mica matrix 38 has a glass fabric layer 40 interwoven with it. In addition to the weave, there may also be a second glass fabric used as a backing for the mica matrix (not shown). In this example the conducting ability of the thin sheet wedge may be enhanced by the direct connection the glass fabric interweave creates between either side of the thin sheet wedge. In some embodiments the glass fabric interweave may provide enough semi-conducting ability without the need to impregnate the mica with the conducting resin.

Though a glass fabric may be used to either enhance the conductive quality of the thin sheet wedge or for easier handling of the mica flakes, there should be a greater ratio of mica matrix to glass fabric. If the glass fabric is used, the ratio of mica matrix to glass fabric in the thin sheet wedge is approximately 2:1 by weight to approximately 7:1 by weight.

Another component of the thin sheet wedge is the conducting resin. The amount of resin used varies depending on the application, the content of the glass fabric and the type of conducting resin used. Approximate content of the resin in the thin sheet wedge is from 15–40% by weight.

Types of conducting resin that may be used with the present invention include resins with conductive particles. Conductive particles that may be used include, but are not limited to, silicon carbide, graphite, conducting polymers and metal such as silver, aluminum and copper. In particular acetylene black (carbon black or C-black) is used. C-black is formed from the pyrolyses of acetylene, $C_2H_2$. Other types of conducting resin will be apparent to one of ordinary skill in the art. When heavier conducting particles are used, the approximate content of the resin in the thin sheet wedge by weight is from 25–45% by weight.

It is expected that when the thin sheet wedge of the present invention is used in high power applications that surface layers of the resin will wear from discharges. However the mica matrix will protect the impregnated resin, thus maintaining the semi-conducting integrity of the thin sheet wedge.

A certain percentage of the resin in the thin sheet wedge may not be conductive. This resin is typically used to bind mica particles together, or to bind mica particles to glass fiber tape, prior to impregnation of the conductive resin. If the binder resin is used, it will comprise about 4–9% by weight of the thin sheet wedge.

In one embodiment the present invention provides for semi-conducting thin sheet wedges. The thin sheet wedges comprise a mica matrix (laminate). The mica matrix itself comprises mica flakes. A conductive resin is impregnated within the mica matrix, conferring the thin sheet wedge with a semi-conductive property, measure at 500–500,000 ohms per square, and a tensile modulus of from 1–8 million PSI.

In one embodiment the thickness of the thin sheet wedges have a thickness of between 15–80 mils (0.38–2.0 mm).

In one embodiment the mica flakes comprise muscovite, phlogopite or mixtures of the two.

In a particular embodiment the resin comprises approximately 15–40% by weight of the thin sheet wedges.

In another particular embodiment the resin is C-black.

In another embodiment the thin sheet wedges have at least one tapered end.

In another embodiment the present invention provides for at least one glass fiber layer in the thin sheet wedge. The glass fiber layer may be used as a backing for the mica matrix, a interweave to improve conductivity, or both.

In a particular embodiment the glass fiber interweave is interwoven in a half-lap manner.

In one embodiment the ratio of the mica in the mica matrix to the glass fiber is approximately between 2:1 and 7:1 by weight.

In another embodiment the present invention provides for a method of making a semi-conductive thin sheet wedge. The method comprises layering mica flakes onto a glass fiber backing and impregnating it with a conductive resin. The resin is then cured.

In still another embodiment the present invention provides for a method of making a semi-conductive thin sheet wedge. The method comprises layering a glass fiber interweave with a mica matrix. A semi-cured conductive resin is applied at varying stages depending on desired penetration of the resin through the mica matrix and glass fiber. The whole layers are then compressed and heated.

Though a generator environment is a particular application of the present invention, there are other applications to which this invention may be used that will be apparent to one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. Semi-conducting thin sheet wedges comprising:
a mica matrix, wherein said mica matrix comprises mica flakes; and
  a conductive resin impregnated within said mica matrix;
wherein said thin sheet wedges have a semi-conductive property of between 500–500,000 ohms per square, wherein said conductive resin comprises a resin and conductive particles.

2. The semi-conducting thin sheet wedges of claim 1, wherein said thin sheet wedges have a thickness of between about 15–80 mils (0.38–2.0 mm).

3. The semi-conducting thin sheet wedges of claim 1, wherein said mica flakes comprise at least one of muscovite, phlogopite and combinations thereof.

4. The semi-conducting thin sheet wedges of claim 1, wherein said resin comprises approximately 15–40% by weight of said thin sheet wedges.

5. The semi-conducting thin sheet wedges of claim 1, wherein said resin comprises C-black.

6. The semi-conducting thin sheet, wedges of claim 1, wherein said thin sheet wedges have a tensile modulus of between 1–8 million PSI.

7. The semi-conducting thin sheet wedges of claim 1, wherein said thin sheet wedges further comprises at least one glass fiber layer.

8. The semi-conducting thin sheet wedges of claim 7, wherein the ratio of the mica in said mica matrix to the glass fiber is approximately between 2:1 and 7:1 by weight.

9. The semi-conducting thin sheet wedges of claim 7, wherein said at least one glass fiber layer forms a backing for said mica matrix.

10. The semi-conducting thin sheet wedges of claim 7, wherein said at least one glass fiber layer is interwoven with said mica matrix.

11. The semi-conducting thin sheet wedges of claim 10, wherein said at least one glass fiber layer is interwoven in a half-lap manner.

12. Semi-conducting thin sheet wedges comprising:
a mica matrix, wherein said mica matrix comprises mica flakes;
at least one layer of glass fiber; and
a conductive resin impregnated within at least one of said mica matrix and said at least one layer of glass fiber, wherein said conductive resin comprises a resin and conductive particles;
wherein said thin sheet wedges have a semi-conductive property of between 500–500,000 ohms per square;
wherein said thin sheet wedges have a tensile modulus of between 1–8 million PSI.

13. The semi-conducting thin sheet wedges of claim 12, wherein the ratio of the mica in said mica matrix to the glass fiber is approximately between 2:1 and 7:1 by weight.

14. The semi-conducting thin sheet wedges of claim 12, wherein said at least one glass fiber layer forms a backing for said mica matrix.

15. The semi-conducting thin sheet wedges of claim 12, wherein said at least one glass fiber layer is interwoven with said mica matrix.

16. The semi-conducting thin sheet wedges of claim 15, wherein said at least one glass fiber layer is interwoven in a half-lap manner.

17. The semi-conducting thin sheet wedges of claim 12, wherein said mica flakes comprise at least one of muscovite, phlogopite and combinations thereof.

18. The semi-conducting thin sheet wedges of claim 12, wherein said resin comprises approximately 15–40% by weight of said thin sheet wedges.

19. The semi-conducting thin sheet wedges of claim 12, wherein said resin comprises C-black.

20. A method for making semi-conductive thin sheet wedges comprising:
layering a mica matrix onto a glass fiber backing, wherein said mica matrix comprises mica flakes;
impregnating into said mica matrix and said glass fiber a conductive resins,
wherein said conductive resin comprises a resin and conductive particles; and
curing said conductive resin.

* * * * *